United States Patent
Kuo et al.

(10) Patent No.: US 10,642,057 B2
(45) Date of Patent: May 5, 2020

(54) LIGHT REDIRECTING FILM AND METHOD FOR MANUFACTURING THE SAME

(71) Applicant: BenQ Materials Corporation, Taoyuan (TW)

(72) Inventors: Chen-Kuan Kuo, Taoyuan (TW); Cyun-Tai Hong, Taoyuan (TW); Chuen-Nan Shen, Taoyuan (TW); Chung-Hung Chien, Taoyuan (TW); Hung-Jiun Shieh, Taoyuan (TW); Tsung-Chi Yeh, Taoyuan (TW); Fung-Hsu Wu, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 95 days.

(21) Appl. No.: 15/820,413

(22) Filed: Nov. 21, 2017

(65) Prior Publication Data

US 2019/0025605 A1 Jan. 24, 2019

Related U.S. Application Data

(60) Provisional application No. 62/535,145, filed on Jul. 20, 2017, provisional application No. 62/535,154, filed on Jul. 20, 2017.

(51) Int. Cl.
| | |
|---|---|
| *G02F 1/1335* | (2006.01) |
| *G02B 27/42* | (2006.01) |
| *G02B 1/04* | (2006.01) |
| *G02B 5/18* | (2006.01) |
| *G02B 5/02* | (2006.01) |

(52) U.S. Cl.
CPC ............ *G02B 27/4211* (2013.01); *G02B 1/04* (2013.01); *G02B 5/0252* (2013.01); *G02B 5/0278* (2013.01); *G02B 5/1823* (2013.01); *G02B 5/1842* (2013.01); *G02B 5/1847* (2013.01); *G02B 5/1852* (2013.01); *G02B 5/1866* (2013.01); *G02B 27/4272* (2013.01)

(58) Field of Classification Search
CPC .. G02B 5/1866; G02B 5/1852; G02B 5/1871; G02B 5/3083; G02F 1/1335
USPC ........... 359/576, 569, 566; 349/112, 118, 62
See application file for complete search history.

(56) References Cited

U.S. PATENT DOCUMENTS

| | | | | |
|---|---|---|---|---|
| 4,130,347 A | * | 12/1978 | Knop | G02B 5/1809 359/568 |
| 4,795,236 A | * | 1/1989 | Ise | G02B 5/1871 348/291 |
| 5,280,388 A | * | 1/1994 | Okayama | G02B 5/1871 348/342 |
| 5,755,501 A | * | 5/1998 | Shinohara | G02B 5/1866 349/118 |
| 6,147,732 A | * | 11/2000 | Aoyama | G02B 5/3083 349/112 |

(Continued)

*Primary Examiner* — Audrey Y Chang

(57) ABSTRACT

A light redirecting film and a method for manufacturing the same are provided. The light redirecting film comprises a substrate, a first diffraction grating layer of a first curable resin on the substrate and a second diffraction grating layer of a second curable resin on the first diffraction grating layer. Wherein the grating directions of the first diffraction grating layer and the second diffraction grating layer cross each other at an angle of 90±10°, and the difference of the refractive index of the first curable resin and the second curable resin is no less than 0.1 and no more than 0.3.

31 Claims, 19 Drawing Sheets

(56) References Cited

U.S. PATENT DOCUMENTS

| | | | | |
|---|---|---|---|---|
| 6,781,756 B1* | 8/2004 | Ishii | .................... | G02B 5/1866 |
| | | | | 359/566 |
| 6,947,214 B2* | 9/2005 | Okuno | ................ | G02B 5/1814 |
| | | | | 359/569 |
| 7,256,939 B2* | 8/2007 | Tanaka | ................ | G02B 5/1852 |
| | | | | 359/576 |
| 8,736,787 B2* | 5/2014 | Li | ........................ | G02F 1/1335 |
| | | | | 349/62 |
| 2005/0151711 A1* | 7/2005 | Baek | .................. | G09G 3/2003 |
| | | | | 345/88 |

* cited by examiner

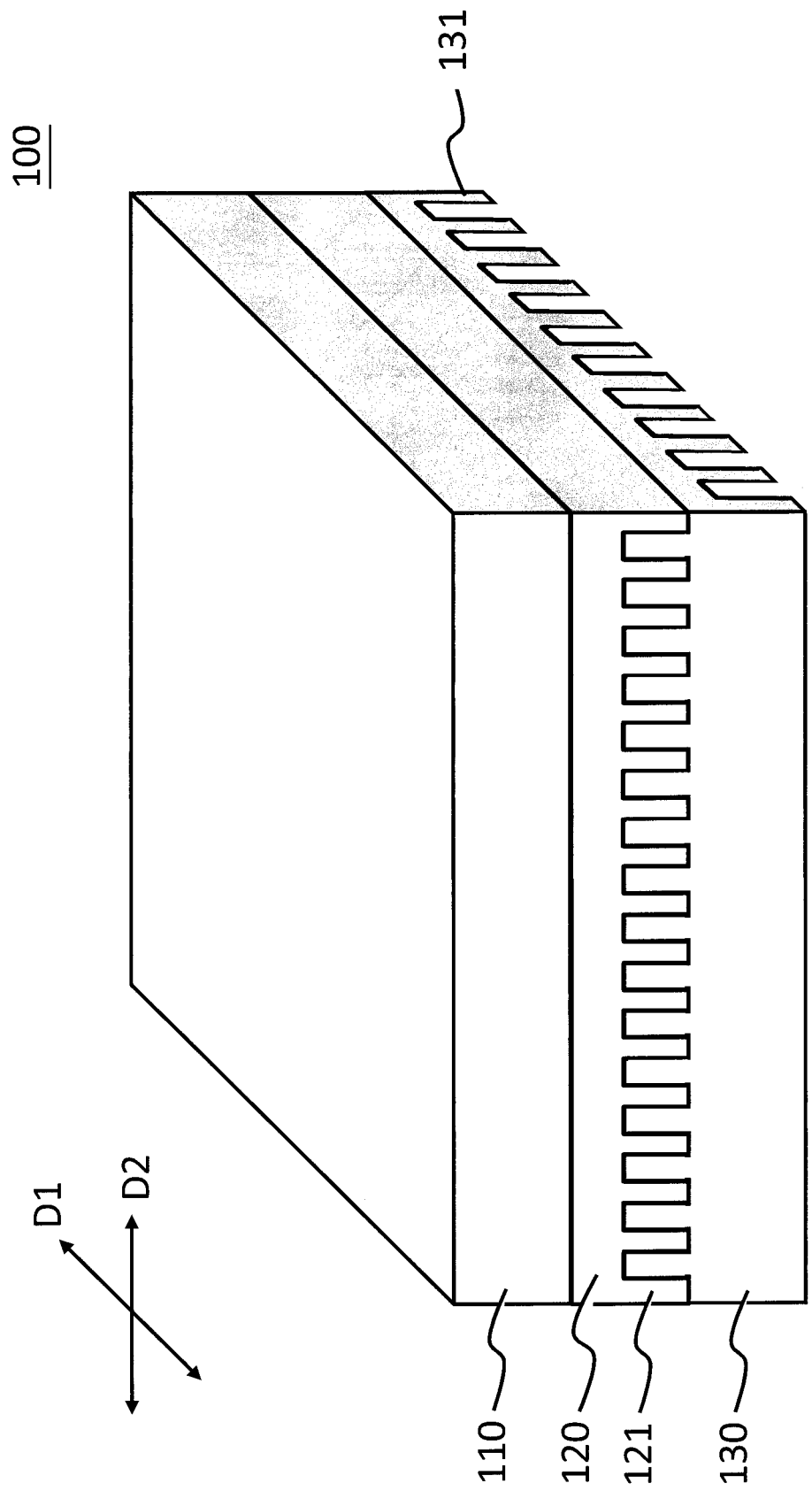

LIGHT REDIRECTING FILM AND METHOD FOR MANUFACTURING THE SAME

This application claims the benefits of U.S. provisional application Ser. No. 62/535,145, filed on Jul. 20, 2017, and U.S. provisional application Ser. No. 62/535,154, filed on Jul. 20, 2017, the subject matters of which are incorporated herein by reference.

BACKGROUND OF THE INVENTION

Field of the Invention

The invention relates in general to a light redirecting film and a method for manufacturing the same, and more particularly relates to a light redirecting film for enhancing contrast ratio at wide viewing angles and a method for manufacturing the same.

Description of the Related Art

The displays with the features of high contrast, no gray level inversion, small color shift, high brightness, high color richness, high color saturation, fast response speed and wide viewing angle are current market trends. The liquid crystal is a modulation material with a high efficiency refractive index used in the display product. However, the symmetries of the liquid crystal molecules at different viewing angles are different, and thus, the optical paths of a normal light and an oblique light penetrating through the liquid crystal in the display will be different. Therefore, general displays such as liquid crystal displays (LCDs) or organic light emitting diode (OLED) displays are prone to appear color washout or gray-scale inversion phenomenon at wide viewing angles which result in lower contrast ratio or abnormal color performance of images.

Several approaches for improving the disadvantages of display have been proposed. For example, the equalized images at central viewing angles and at wide viewing angles of a display can be achieved by using a wide viewing angle film and a twisted nematic (TN) liquid crystal, or by using a multi-domain vertical alignment (MVA) display, or by using a diffusion layer or a diffraction layer on the surface of display.

However, the wide viewing angle film for the TN liquid crystal is expensive; the manufacturing process of MVA display is complicated and too costly, and the process yield is low; the diffusion layer is difficult to precisely control the light emitted from the different viewing angles of the display, and it is difficult for the diffraction layer to simultaneously control the different dimensional light paths with only a single diffraction structure layer.

Therefore, the present invention intends to provide a light redirecting film with two-dimensional diffraction structure for displays and a method for manufacturing the same to avoid the problem of color washout or gray-scale inversion phenomenon, and enhance the performance of displays.

SUMMARY OF THE INVENTION

The present invention is directed to a light redirecting film with two-dimensional diffraction structure for displays and a method for manufacturing the same. According to an aspect of the present invention, a light redirecting film is provided. The present light redirecting film comprises a substrate, a first diffraction grating layer comprising a plurality of first gratings along with the first direction formed on the substrate, and a second diffraction grating layer comprising a plurality of second gratings along with the second direction formed on the first diffraction grating layer. The first direction and the second direction cross each other at an angle of 90±10°. The first diffraction grating layer includes a first curable resin having a first refractive index of n1, and the second diffraction grating layer include a second curable resin having a second refractive index of n2, wherein n1 and n2 are independently in the range of 1.4 to 1.7, and the difference of n1 and n2 is no less than 0.1 and no more than 0.3.

In another aspect of the light redirecting film of present invention, the present light redirecting film further comprises a third curable resin having a third refractive index of n3 coated on the second diffraction grating layer, wherein the difference of n2 and n3 is no less than 0.1 and no more than 0.3, and n2 is greater than n1 and n3.

In further another aspect of the light redirecting film of present invention, the light redirecting film is adhered to an optical film such as a polarizing film, a hard-coating film, a low reflective film, an anti-reflective film, an anti-glaring film and a protective film.

According to another aspect of the present invention, a method for manufacturing a light redirecting film is provided. The method for manufacturing a light redirecting film comprises the steps of providing a substrate; coating a first curable resin with a first refractive index of n1 on the first substrate; embossing the first curable resin and curing thereafter to form a first diffraction grating layer comprising a plurality of first gratings along with first direction; coating a second curable resin with a second refractive index of n2 on the first diffraction grating layer; and embossing the second curable resin and curing thereafter to form a second diffraction grating layer comprising a plurality of second gratings along with second direction; wherein the first direction and the second direction cross each other at an angle of 90±10°, and the difference of n1 and n2 is no less than 0.1 and no more than 0.3.

In further another aspect of the method for manufacturing the light redirecting film of the present invention, it further comprises the steps of coating a third curable resin with a third refractive index n3 on the second diffraction grating layer and curing the third curable resin thereafter, wherein the difference of n2 and n3 is no less than 0.1 and no more than 0.3, and n2 is greater than n1 and n3.

In still further another aspect of the method for manufacturing the light redirecting film of the present invention, it further comprises a step of adhering at least one optical film such as a polarizing film, a hard-coating film, a low reflective film, an anti-reflective film, an anti-glaring film and a protective film to the cured third curable resin.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 1A is a stereoscopic perspective view of a light redirecting film of a preferred embodiment of the present invention;

DETAILED DESCRIPTION OF THE INVENTION

Figure 1B:
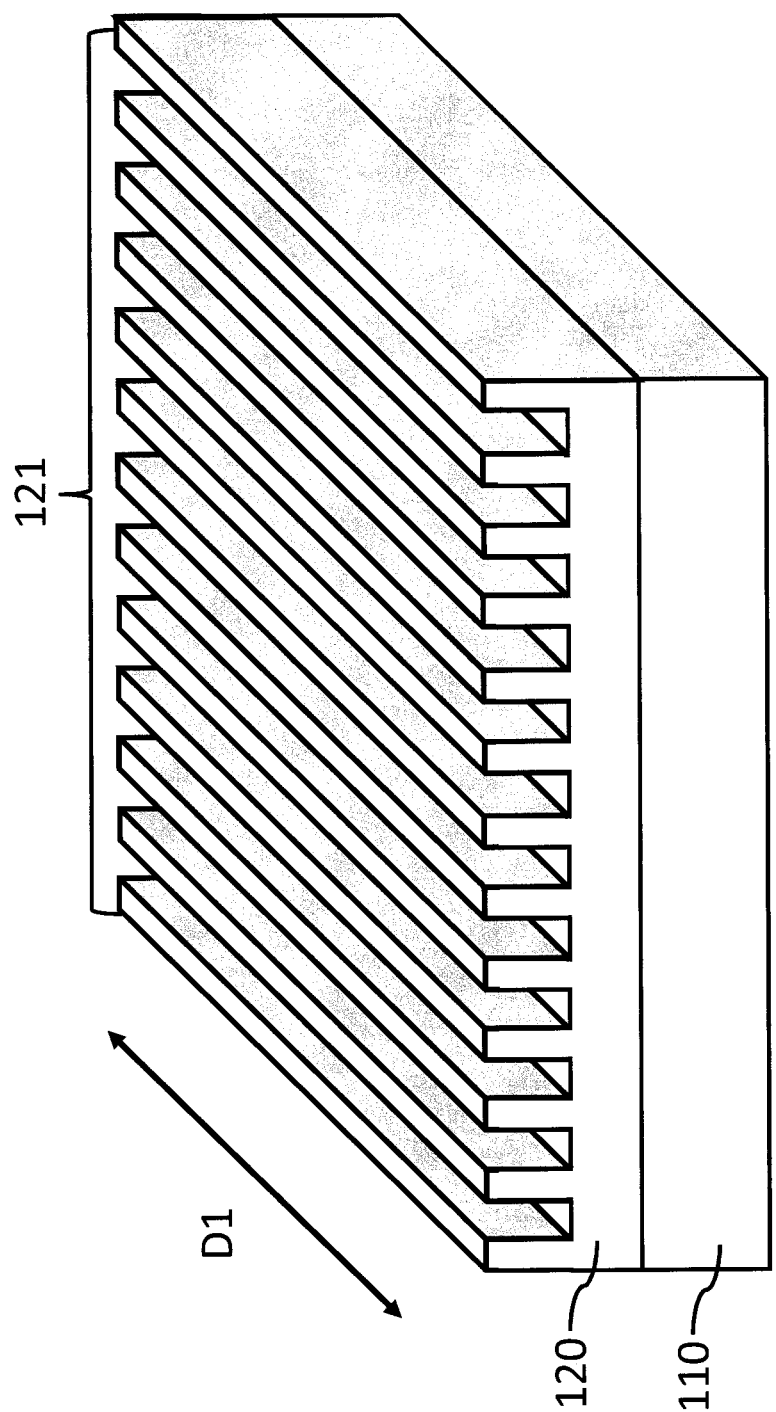
FIG. 1B is a stereoscopic perspective view of the first diffraction grating layer formed on the substrate as illustrated in FIG. 1A.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In the following description, numerous specific details are described in detail in order to enable the reader to fully understand the following examples. However, embodiments of the present invention may be practiced in case no such specific details. In other cases, in order to simplify the drawings, the structure of the apparatus known only schematically depicted in figure.

A light redirecting film 100 of a preferred embodiment of the present invention is shown in FIG. 1A. The present light redirecting film 100 comprises a substrate 110, a first diffraction grating layer 120 formed on the substrate 110, and a second diffraction grating layer 130 formed on the first diffraction grating layer 120. The first diffraction grating layer 120 comprises a plurality of first gratings 121 along with first direction, D1 and the second diffraction layer 130 comprises a plurality of second gratings 131 along with second direction D2, wherein the first direction D1 and the second direction D2 cross each other at an angle of 90±10°. The first diffraction grating layer 120 includes a first curable resin having a first refractive index of n1, and the second diffraction grating layer 130 includes a second curable resin having a second refractive index of n2, and the difference of n1 and n2 is no less than 0.1 and no more than 0.3.

The substrate 110 can be a film of a poly(ethylene terephthalate) (PET), polycarbonate (PC), triacetyl cellulose (TAC), poly(methyl methacrylate) (PMMA) or cyclo-olefin polymer (COP). The thickness of the substrate 110 is in the range of 30 microns to 300 microns.

As shown in FIG. 1B, the first diffraction grating layer 120 with a plurality of first gratings 121 along with first direction D1 is formed by embossing a first curable resin (not shown) having a first refractive index of n1 stacked on the substrate 110 and curing the embossed first curable resin (not shown) thereafter. The first curable resin (not shown) can be an UV curable resin or a thermal curable resin, and the first refractive index of n1 is in the range of 1.4 and 1.7. The first curable resin (not shown) can be, for example, an acrylic resin, a silicone resin, a polyurethane resin, an epoxy resin or combinations thereof.

Figure 2A:
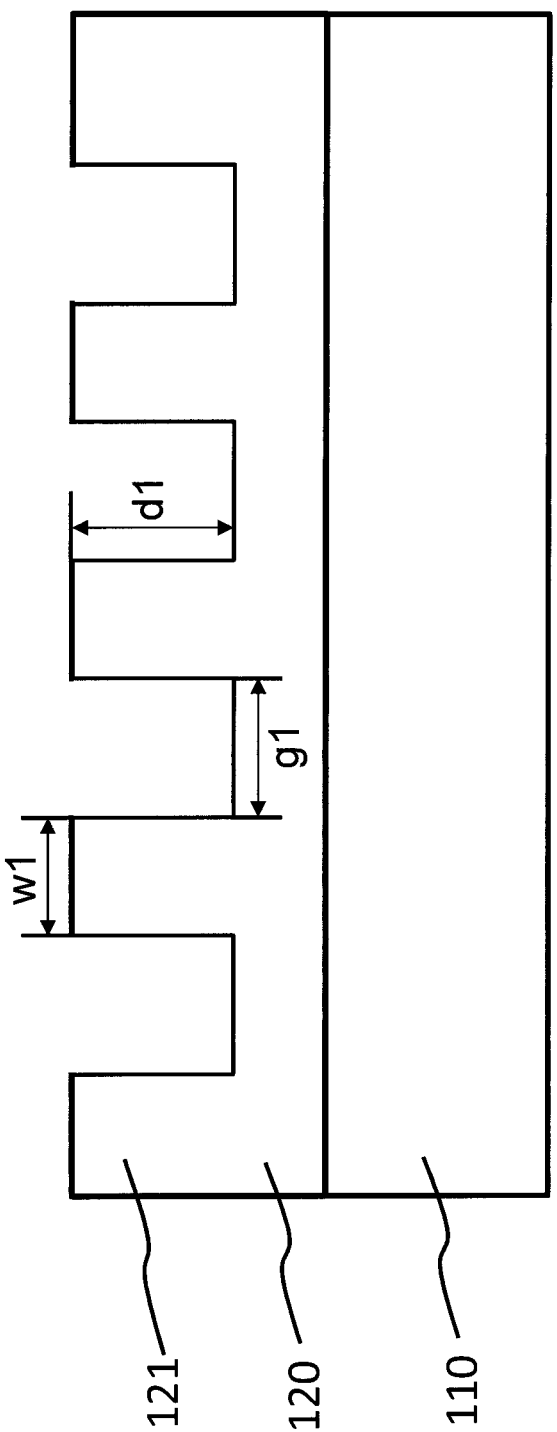
FIG. 2A is a cross-sectional view of the first diffraction grating layer formed on the substrate as illustrated in FIG. 1B along with D2 direction.

The dimensions of the first gratings 121 can be determined by the demand of different designs of displays. Referred to FIG. 1B and FIG. 2A, FIG. 2A shows a cross-sectional view of the first diffraction grating layer 120 formed on the substrate 110 as shown in FIG. 1B along with the second direction D2. As shown in FIG. 2A, each of the first gratings 121 of the first diffraction grating layer 120 has a width of w1 in the range of 0.3 μm to 1.5 μm, and preferably in the range of 0.4 μm to 0.6 μm, a height of d1 in the range of 0.5 μm to 1.5 μm, and preferably in the range of 0.7 μm to 1.3 μm. The gap of g1 between adjacent two of the first gratings 121 is in the range of 0.3 μm to 1.5 μm, and preferably in the range of 0.4 μm to 0.6 μm. The first gratings 121 of the first diffraction grating layer 120 can have the same or different dimensions, and can be sequentially and periodically or randomly formed on the surface of the first diffraction grating layer 120.

Figure 1C:
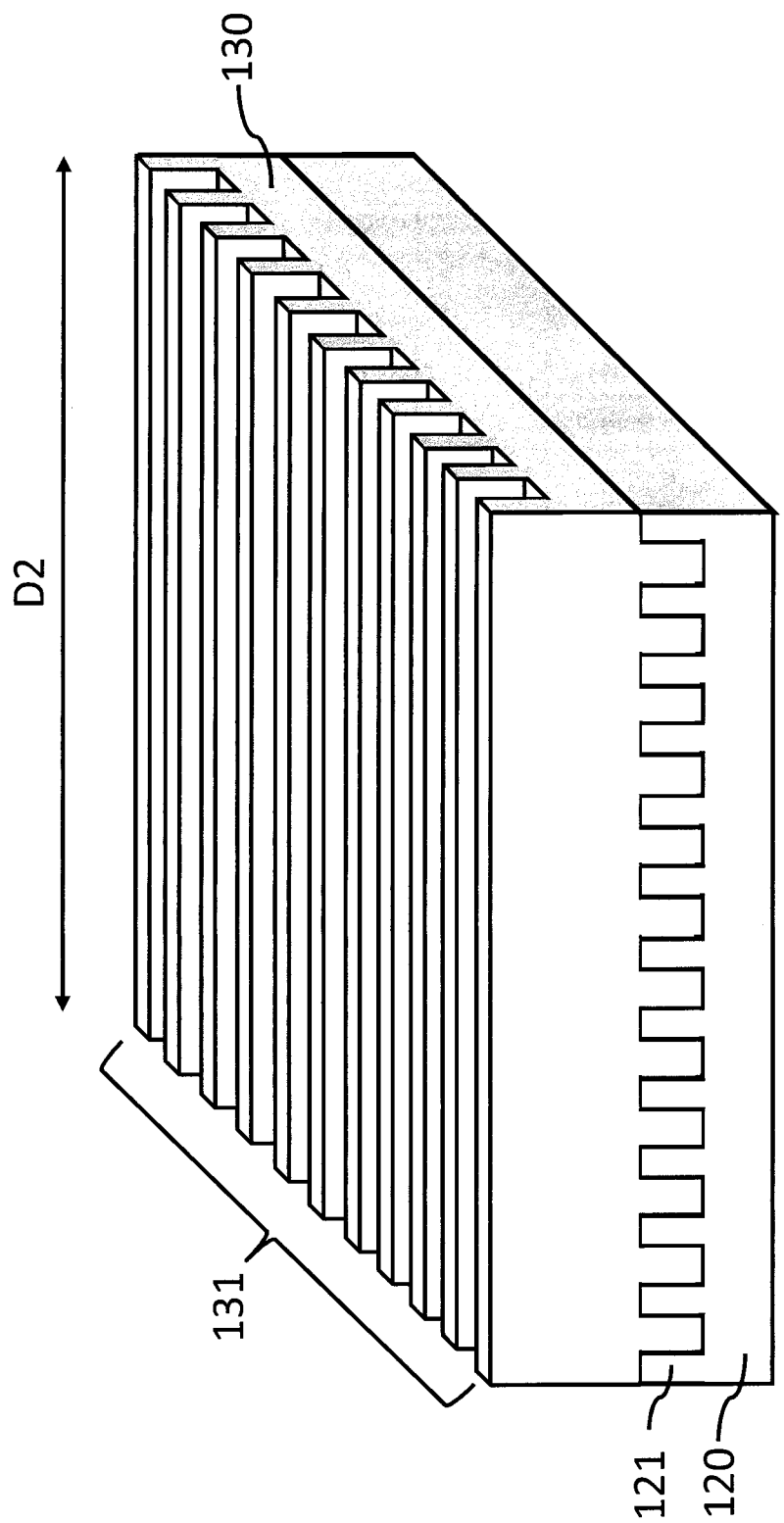
FIG. 1C is a stereoscopic perspective view of the second diffraction grating layer formed on the first diffraction grating layer as illustrated in FIG. 1B.

As shown in FIG. 1C, the second diffraction grating layer 130 with a plurality of second gratings 131 along with second direction D2 is formed by embossing a second curable resin (not shown) with a second refractive index of n2 formed on the first diffraction grating layer 120 and curing the embossed second curable resin (not shown) thereafter, wherein D1 and D2 cross each other at an angle of 90±10°. The second curable resin (not shown) can be an UV curable resin or a thermal curable resin. The second curable resin (not shown) can be, for example, an acrylic resin, a silicone resin, a polyurethane resin, an epoxy resin or combinations thereof. The second refractive index of n2 is in the range of 1.4 and 1.7, and the difference of n1 and n2 is no less than 0.1 and no more than 0.3.

Figure 2B:
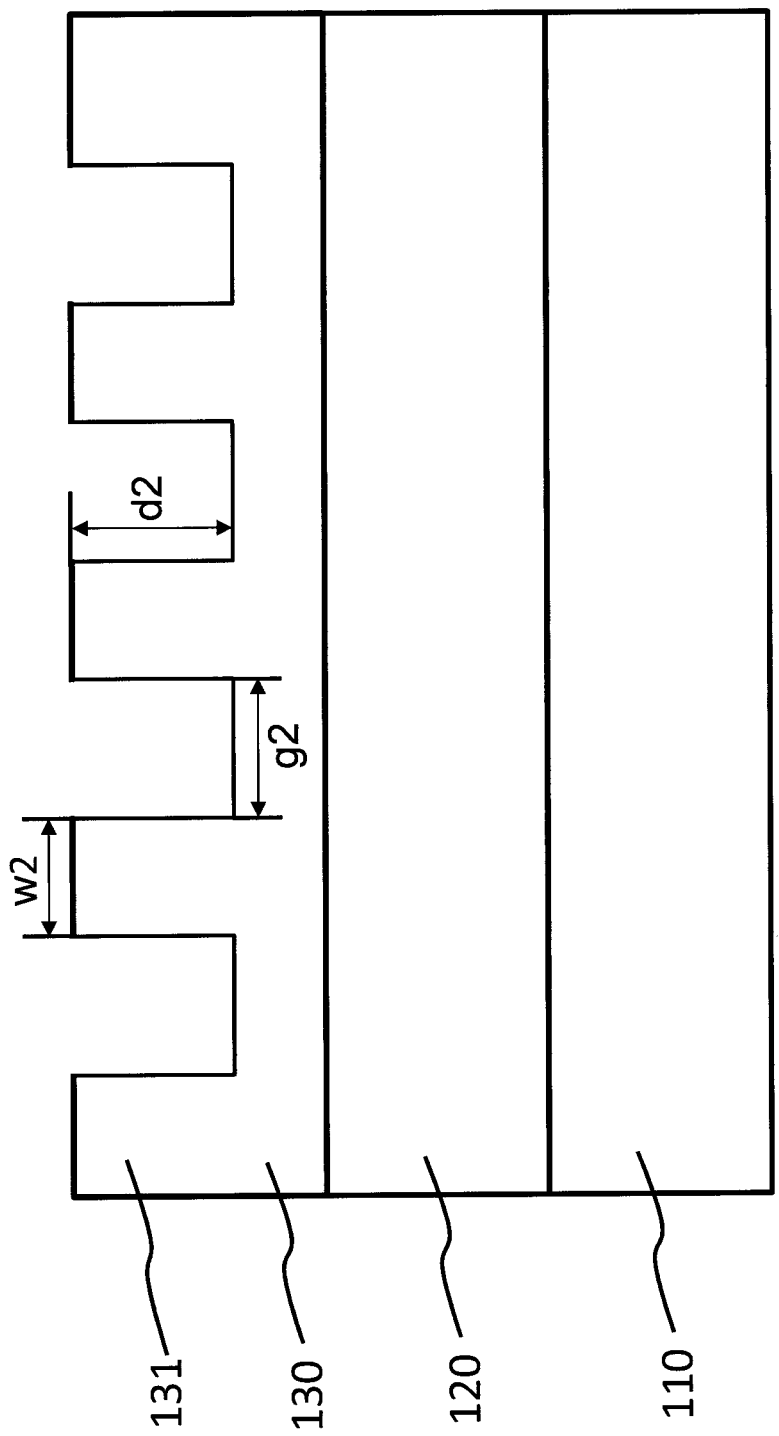
FIG. 2B is a cross-sectional view of the second diffraction grating layer formed on the first diffraction layer as illustrated in FIG. 1C along with D1 direction.

The dimensions of the second diffraction grating layer 130 can be determined by the demand of different designs of displays. Referred to FIG. 1C and FIG. 2B, FIG. 2B shows a cross-sectional view of the second diffraction grating layer 130 formed on the first diffraction grating layer 120 as shown in FIG. 1C along with the first direction D1. As shown in FIG. 1C, each of the second gratings 131 has a width of w2 in the range of 0.3 μm to 1.5 μm, and preferably in the range of 0.7 μm to 1.3 μm, a height of d2 in the range of 0.5 μm to 1.5 μm, and preferably in the range of 0.9 μm to 1.0 μm. The gap of g2 between two adjacent of the second gratings 131 is in the range of 0.3 μm to 1.5 μm, and preferably in the range of 0.7 μm to 1.3 μm. The second gratings 131 of the second diffraction grating layer 130 can have the same or different dimensions, and can be sequentially and periodically or randomly formed on the surface of the second diffraction grating layer 130.

The first diffraction grating layer 120 and the second diffraction grating layer 130 can be adapted to improve the color washout or gray-scale inversion phenomenon at horizontal viewing angles and vertical viewing angles of the display respectively. Furthermore, the dimension settings, such as widths, heights and gaps, of the first gratings 121 and the second gratings 131 can be the same or different from each other depending on the demand of different designs of displays. In an embodiment of the invention, the widths, the heights and the gaps of the gratings 121 of the first diffraction grating layer 120 and the second gratings 131 of the second diffraction grating layer 130 are the same. In another embodiment of the invention, the widths, the heights and the gaps of the first gratings 121 of the first diffraction grating layer 120 and the second gratings 131 of the second diffraction grating layer 130 are different.

Figure 1D:
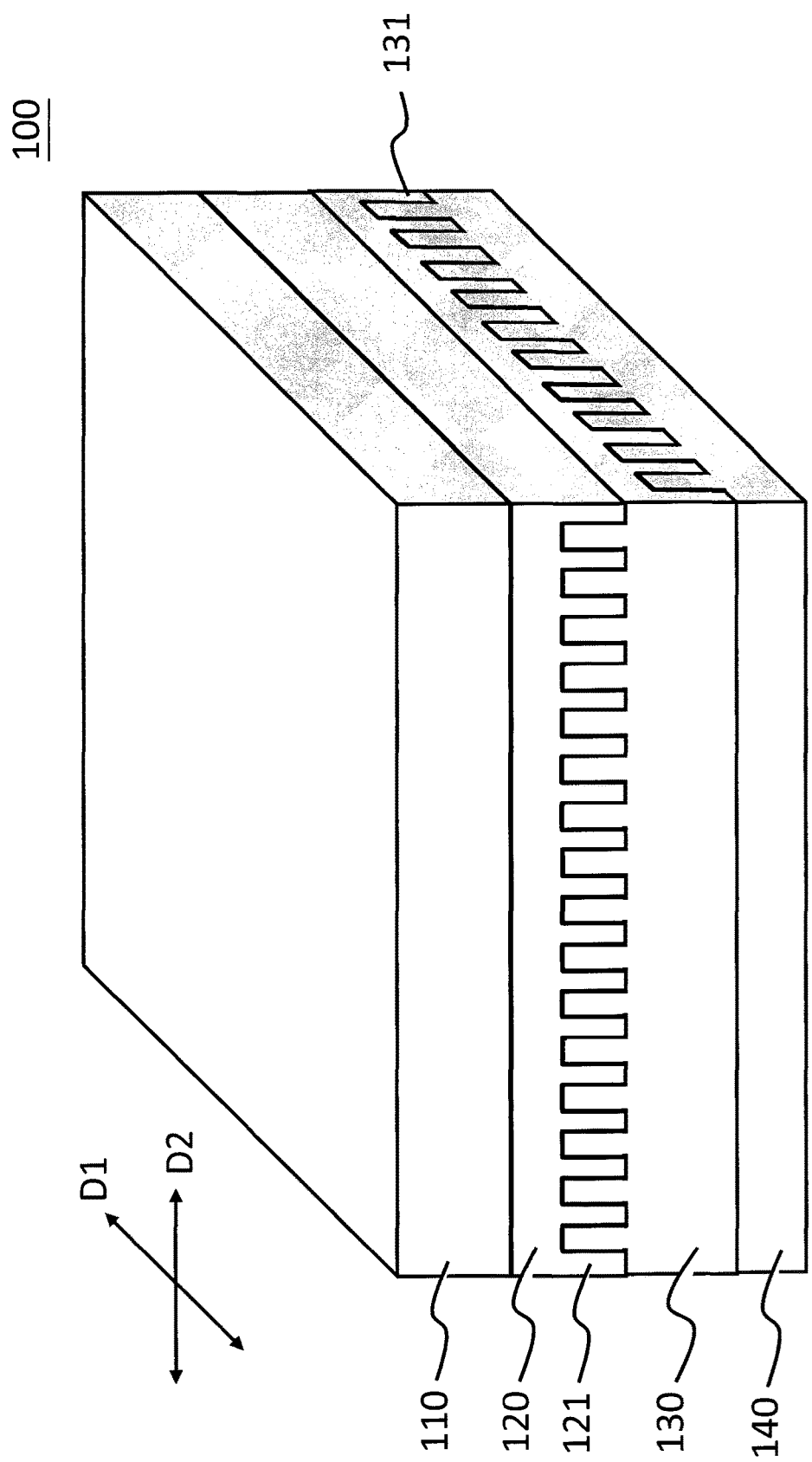
FIG. 1D is a stereoscopic perspective view of a light redirecting film of another preferred embodiment of the present invention.

In another embodiment of the present invention, the light redirection film 100 can further comprise a third curable resin 140 with a third refractive index of n3 formed on the second diffraction grating layer 130 as shown in FIG. 1D. The third curable resin 140 can be an UV curable resin or a thermal curable resin. The third curable resin 140 can be, for example, an acrylic resin, a silicone resin, a polyurethane resin, an epoxy resin or a combination thereof. The third refractive index of n3 is in the range of 1.4 to 1.7, and the difference of n2 and n3 is no less than 0.1 and no more than 0.3. In a preferred embodiment of the present invention, n2 is greater than n1 and n3, and n1 and n3 can be the same or different.

The light emitted from each pixel of the display, such as LCD, can pass through the first diffraction grating layer 120 and the second diffraction grating layer 130 respectively. Therefore, the light emitted from each pixel of the display can be redirected to desired viewing angles. In addition, compared to the light redirecting film consisted of two laminated conventional diffraction layers, the single light redirecting film of the present disclosure may omit individual encapsulation layers for each conventional diffraction layer, and simplify the design for different refractive indexes of materials of the different layers. Therefore, the light redirecting film of the integrated laminate structure can also reduce the influence on the light transmittance of display.

Figure 3A:
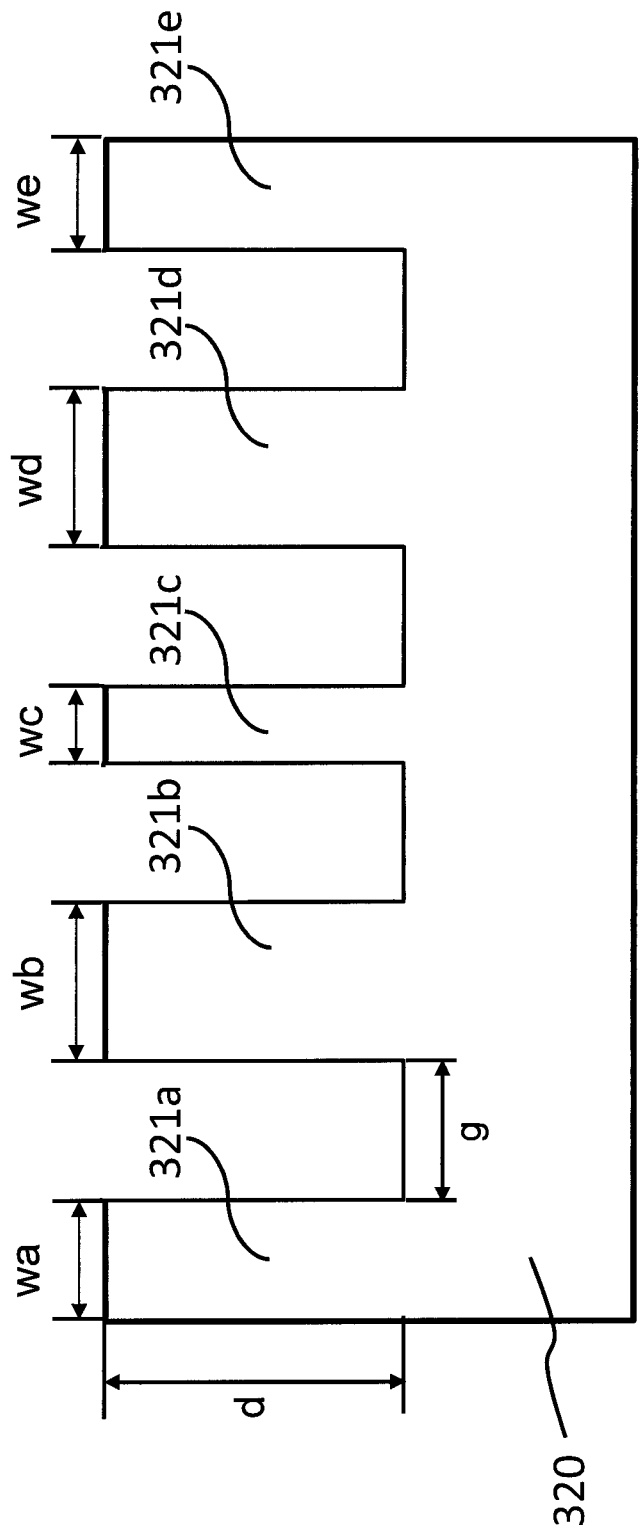
FIG. 3A-3D are cross-sectional perspective views of another diffraction grating layers of the present invention.
Figure 3B:
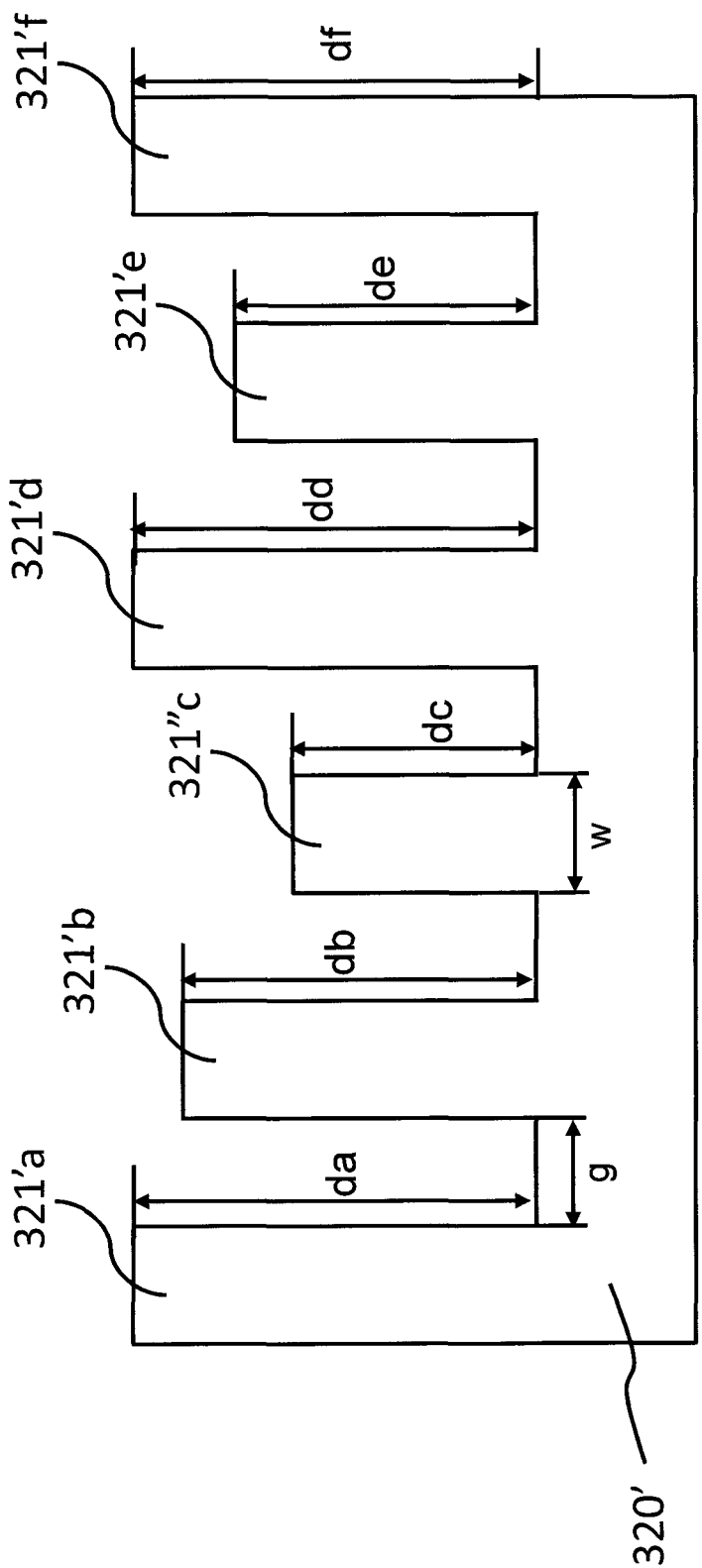
Figure 3C:
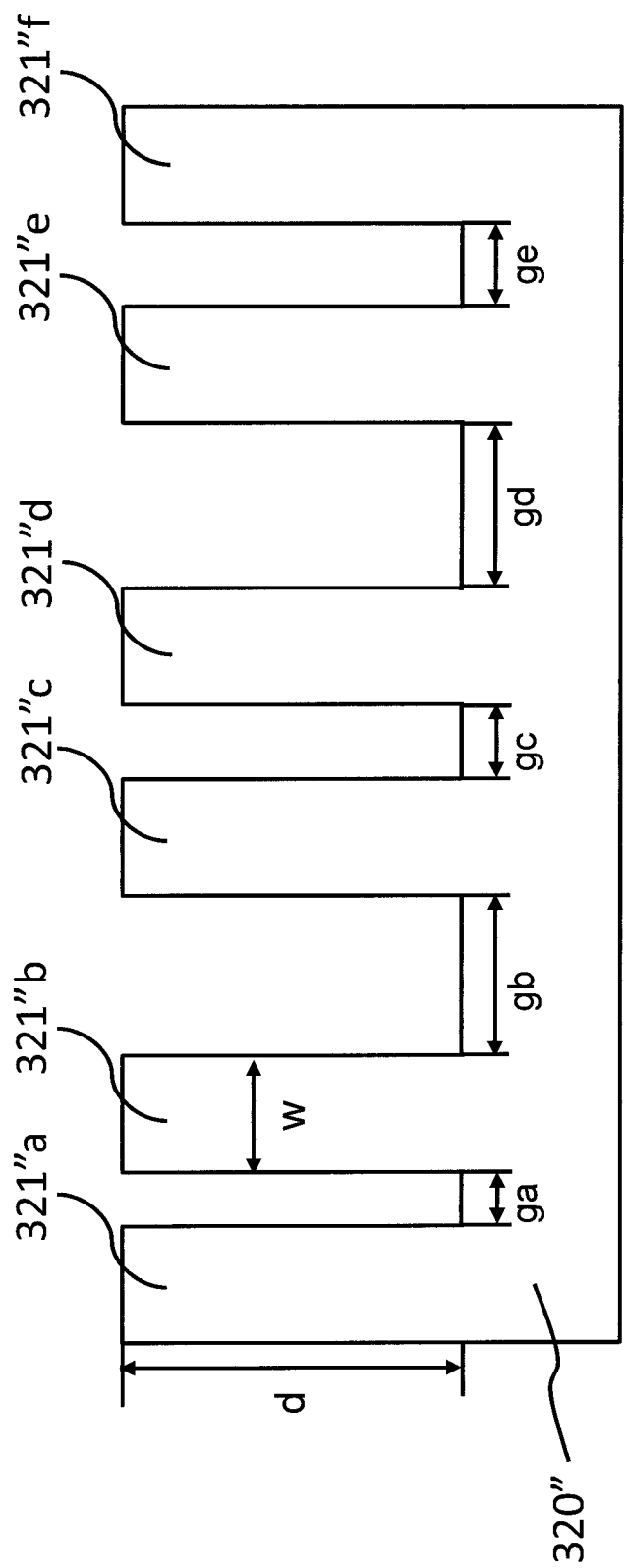
Figure 3D:
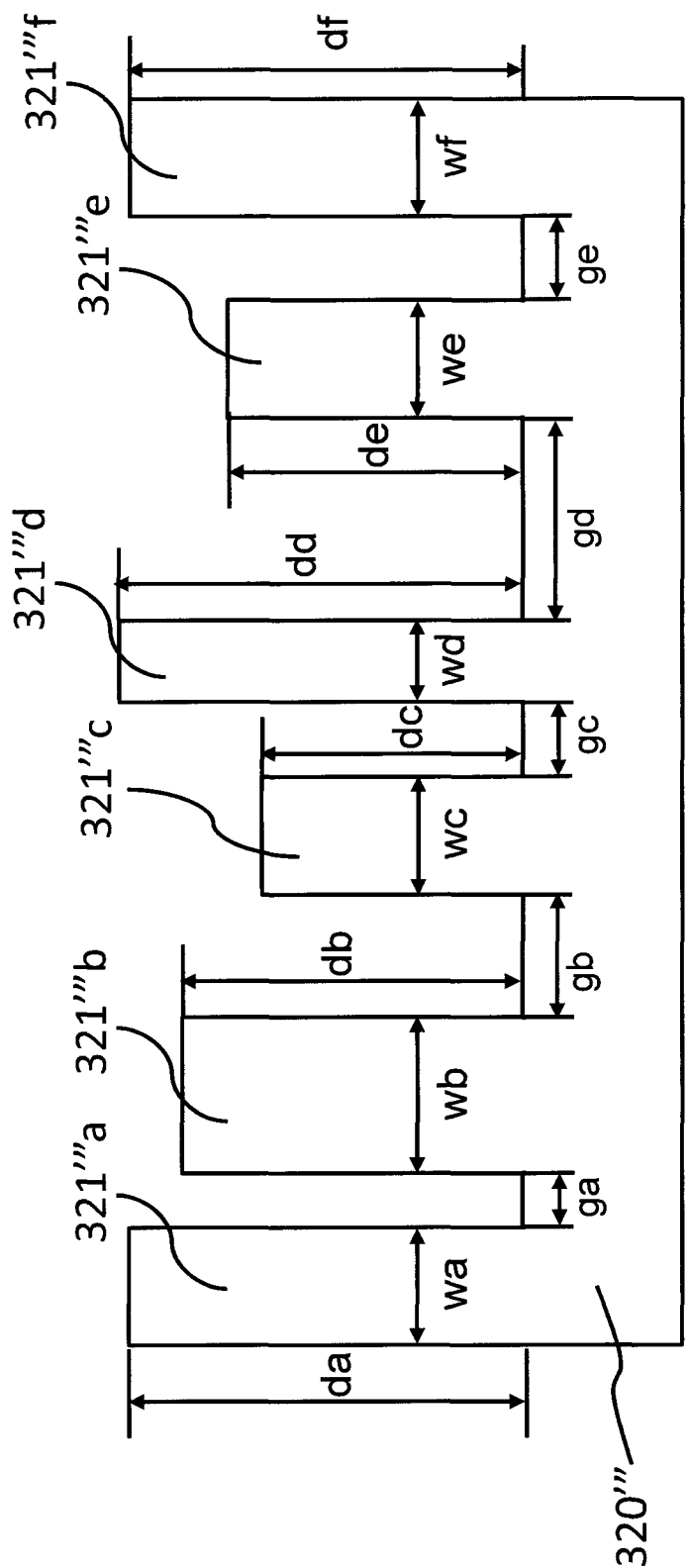

The first gratings 121 of the first diffraction grating layers 120 and/or the second gratings 131 of the second diffraction grating layer 130 of the light redirecting film 100 may have different widths, heights or gaps to compensate for the inconsistent changes of the brightness intensity of different wavelengths at different viewing angles, so that a problem of color-shift phenomenon of a display can be avoided. In addition, the composition ratio of different diffraction grating layers can be adjusted to obtain the optimum color performance for each viewing angle. FIG. 3A to FIG. 3D illustrate another diffraction grating layers of this present invention. FIG. 3A shows a cross-sectional view of a diffraction grating layer 320, wherein the diffraction grating layer 320 comprises gratings 321a~321e with same height of d but different widths of wa~we, and same gap of g between adjacent two of gratings 321a~321e. FIG. 3B shows a cross-sectional perspective view of a diffraction grating layer 320' comprises gratings 321'a~321'f with same width of w but different heights of da~df, and same gap of g between adjacent two of gratings 321'a~321'f. FIG. 3C shows a cross-sectional perspective view of a diffraction grating layer 320" comprising gratings 321"a~321"f with same width of w and same height of d, but different gaps of ga~ge between adjacent two of gratings 321"a~321"f. FIG. 3D shows a cross-sectional perspective view of a diffraction grating layer 320'" comprises gratings 321'"a~321'"f with different widths of wa~wf, different heights of da~df and different gaps of ga~ge between adjacent two of gratngs 321"a~321'"f. The diffraction grating layer 320, 320', 320" and 320'" can be used to replace the first grating layer 120 and/or the second grating layer 130 of the light redirecting film 100 mentioned above.

In an embodiment of the light redirecting film 100 of the present invention, the present light redirecting film 100 is able to be adhered to at least one optical film such as a polarizing film, a hard-coating film, a low reflective film, an anti-reflective film, an anti-glaring film, a protective film or the like. In another embodiment of the light redirecting film 100 of the present invention, the present light redirecting film 100 is able to be adhered to a display panel directly.

Figure 4A:
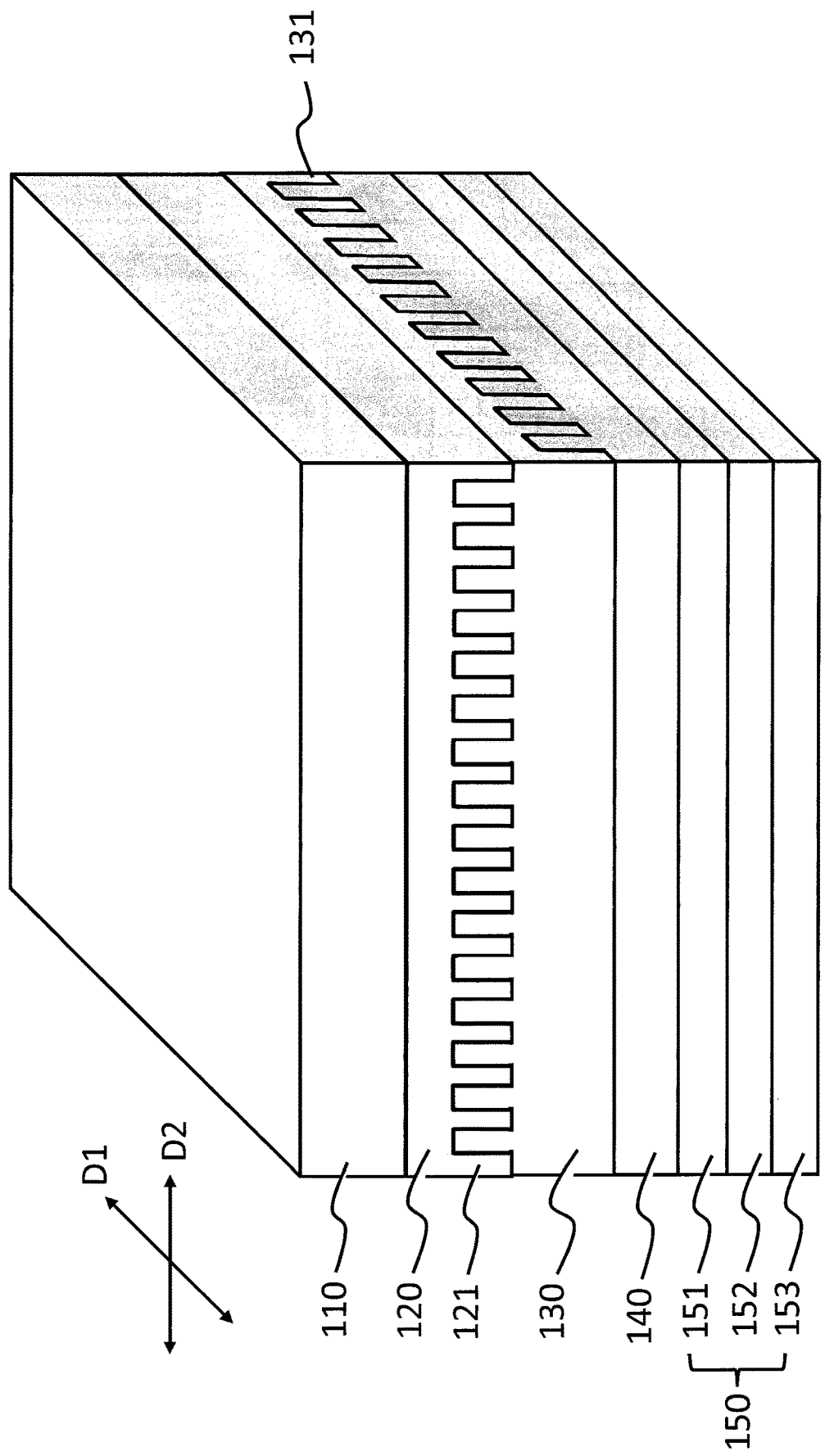
FIG. 4A is a stereoscopic perspective view of another light redirecting film of a preferred embodiment of the present invention.

In an embodiment of the light redirecting film 100 of the present invention, a polarizer with a absorption axis (not shown) parallel to the first direction D1 along with the first gratings 121 or the second direction D2 along with the second grating layer 131 can be adhered to the light redirecting film 100. As shown in FIG. 4A, a polarizer 150 comprises a first protecting layer 151, a polarizing layer 152 and a second protecting layer 153 is adhered to the light redirecting film 100 by attached the first protecting layer 151 of the polarizer 150 to the third curable resin 140 of the light redirecting film 100. In another embodiment of this invention, the polarizer 150 can also be adhered to the light redirecting film 100 by attached the protective layer 151 to an adhesive (not shown) coated on the third curable resin 140.

Figure 4B:
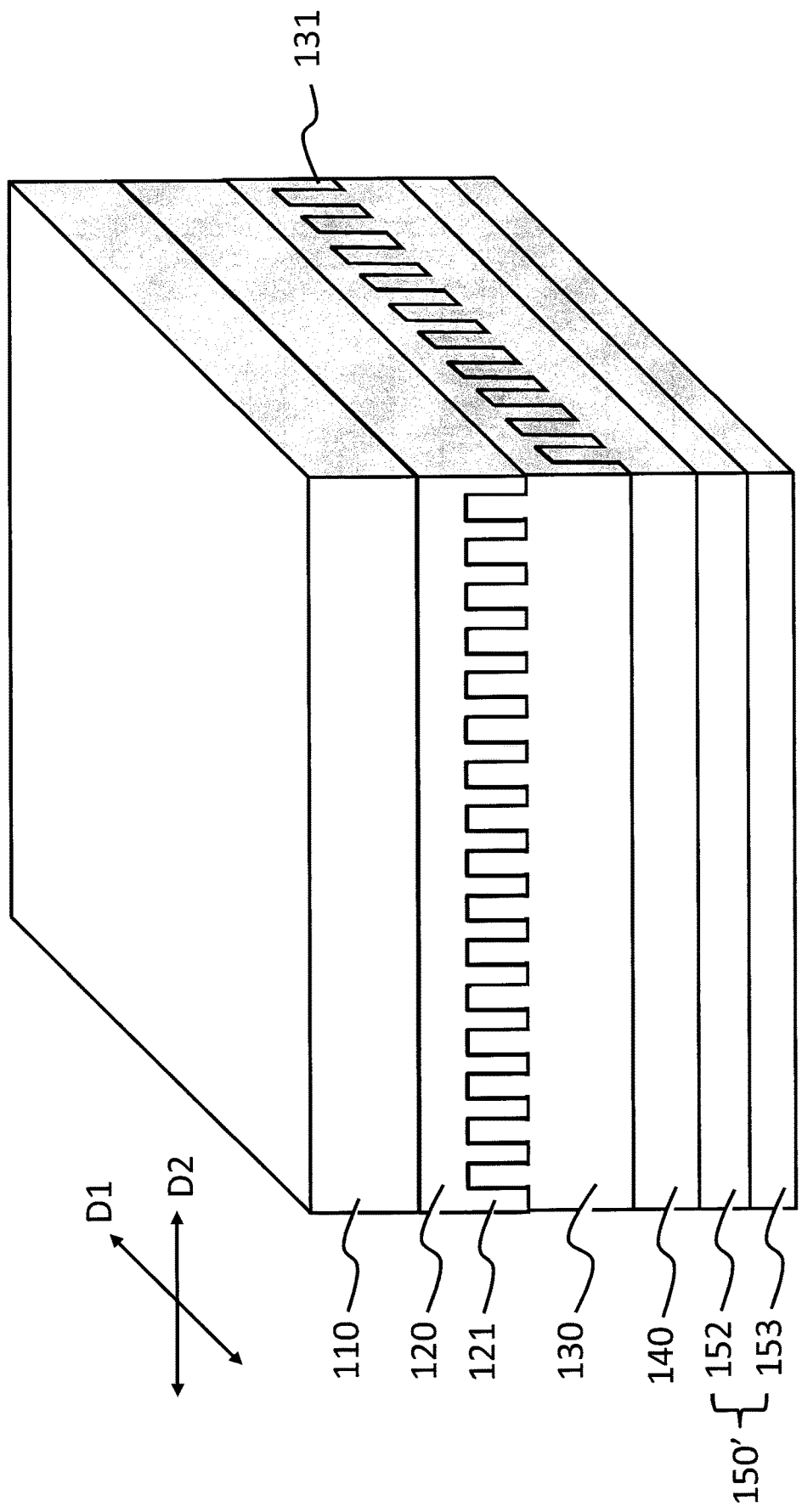
FIG. 4B is a stereoscopic perspective view of another light redirecting film of a preferred embodiment of the present invention.

In another embodiment of the present invention, another polarizer 150' comprises a polarizing layer 152 and a second protecting layer 153 is adhered to the light redirecting film 100 by attached the polarizing layer 152 of the polarizer 150' to the third curable resin 140 of the light redirecting film 100 as shown in FIG. 4B. In another embodiment of this invention, the polarizer 150' can also be adhered to the light redirecting film 100 by attached the polarizing layer 152 to an adhesive (not shown) coated on the third curable resin 140.

The method for manufacturing a light redirecting film is further described as below. A preferred embodiment of the method for manufacturing the light redirecting film 100 of the present invention is illustrated by FIG. 5A to 5F. FIG. 5A to 5F illustrate the steps in a method for manufacturing a light redirecting film of an embodiment of the present invention.

Figure 5A:
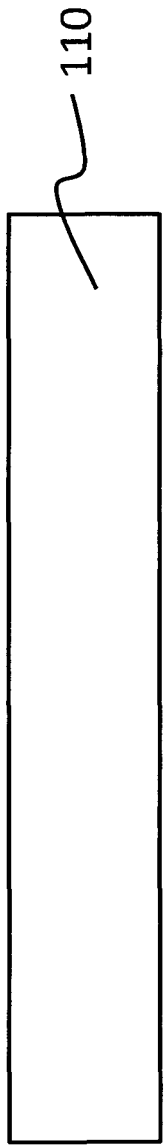
FIG. 5A to 5G illustrate the steps of a method for manufacturing a light redirecting film of an embodiment of the present invention.

Firstly, a substrate 110 is provided, as shown in FIG. 5A. The substrate 110 can be a film of poly(ethylene terephthalate) (PET), polycarbonate (PC), triacetyl cellulose (TAC), poly(methyl methacrylate) (PMMA) or cyclo-olefin polymer (COP). The thickness of the substrate 210 is in the range of 30 μm to 300 μm.

Figure 5B:
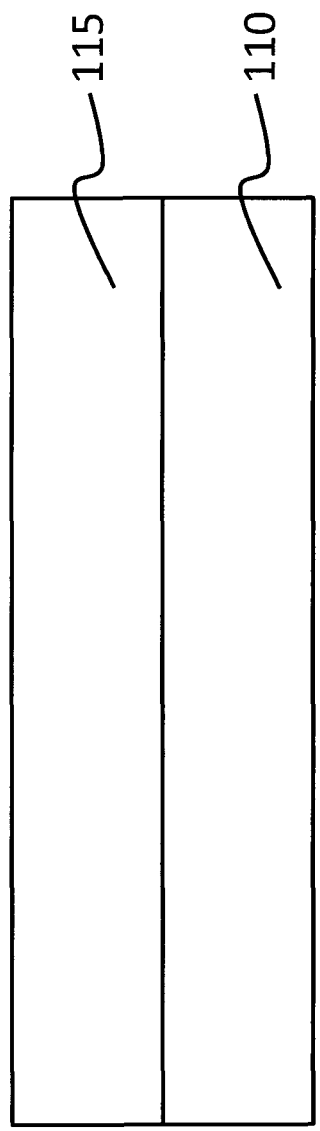

And then, a first curable resin 115 with a first refractive index of n1 is coated on the substrate 110 as shown in FIG. 5B. The first curable resin 115 can be an UV curable resin or a thermal curable resin. The first curable resin 115 can be, for example, an acrylic resin, a silicone resin, a polyurethane resin, an epoxy resin or combinations thereof.

Figure 5C:
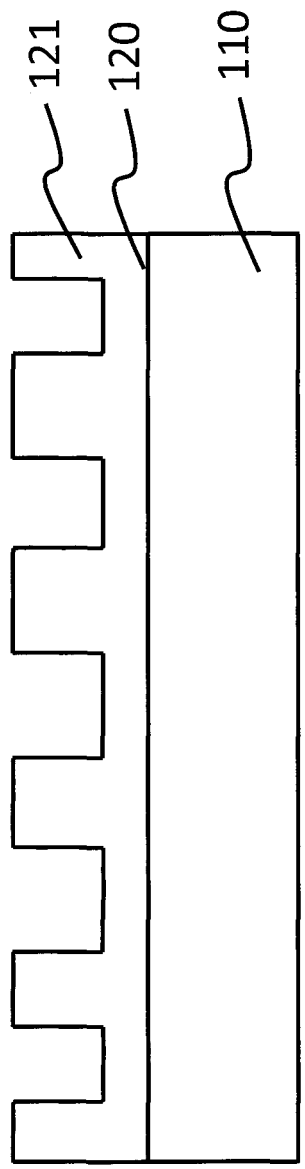

After the first curable resin 115 is coated on the substrate 110, the first curable resin 115 is conducted with an embossing treatment. As shown in FIG. 5C, the first curable resin 115 is embossed to form a first diffraction grating layer 120 with a plurality of first gratings 121 along with first direction D1. The height and width of each first grating 121 and the gaps between adjacent two of the first gratings can be the same of different as mentioned above.

The embossing treatment is effected by a stamp or a roller having a predetermined pattern on the surface thereof. In an embodiment of the method of the present invention, the embossing treatment is effected by such as a grooved roller.

The surface of the roller is molded with a set of relief structures which are grating layer. The set of relief structures is extended along the rotating direction of the roller. In another embodiment of the method of the present invention, the set of the relief structures of the roller is arranged in a direction perpendicular to the rotating direction of the roller.

After the embossing treatment, the first diffraction grating layer 120 is cured by UV radiation or heating treatment depending on the curable resin used. In an embodiment of the method of the present invention, the first curable resin 115 is an UV curable resin, and the first diffraction grating layer 120 is cured by UV radiation. In another embodiment of the method of the present invention, the first curable resin 115 is a thermal curable resin, and the first diffraction grating layer 120 is cured by heating treatment.

Figure 5D:
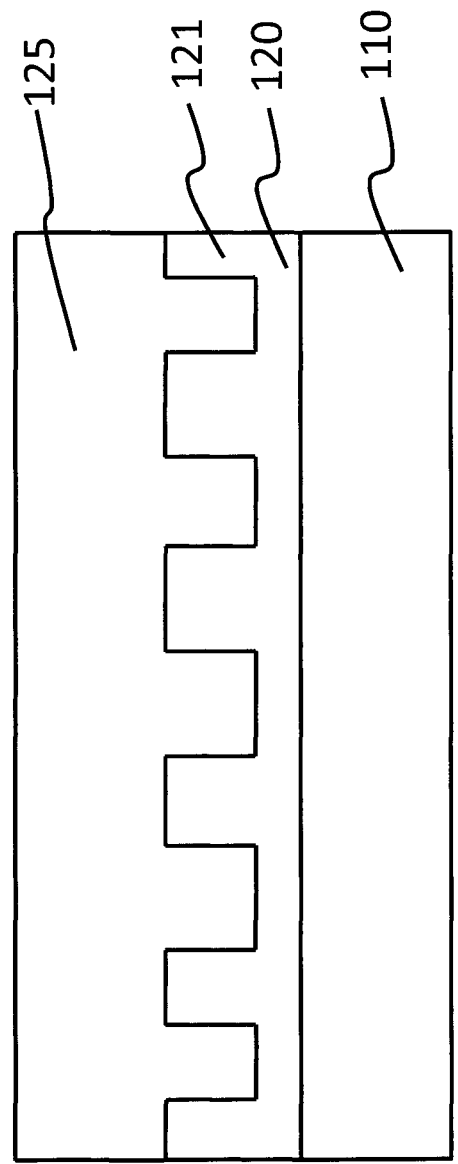

Next, as shown in FIG. 5D, a second curable resin 125 with a second refractive index of n2 is coated on the cured first diffraction grating layer 120. The second curable resin 125 can be an UV curable resin or a thermal curable resin. The second curable resin 125 can be, for example, an acrylic resin, a silicone resin, a polyurethane resin, an epoxy resin or combinations thereof. The difference of n1 and n2 is no less than 0.1 and no more than 0.3.

Figure 5E:
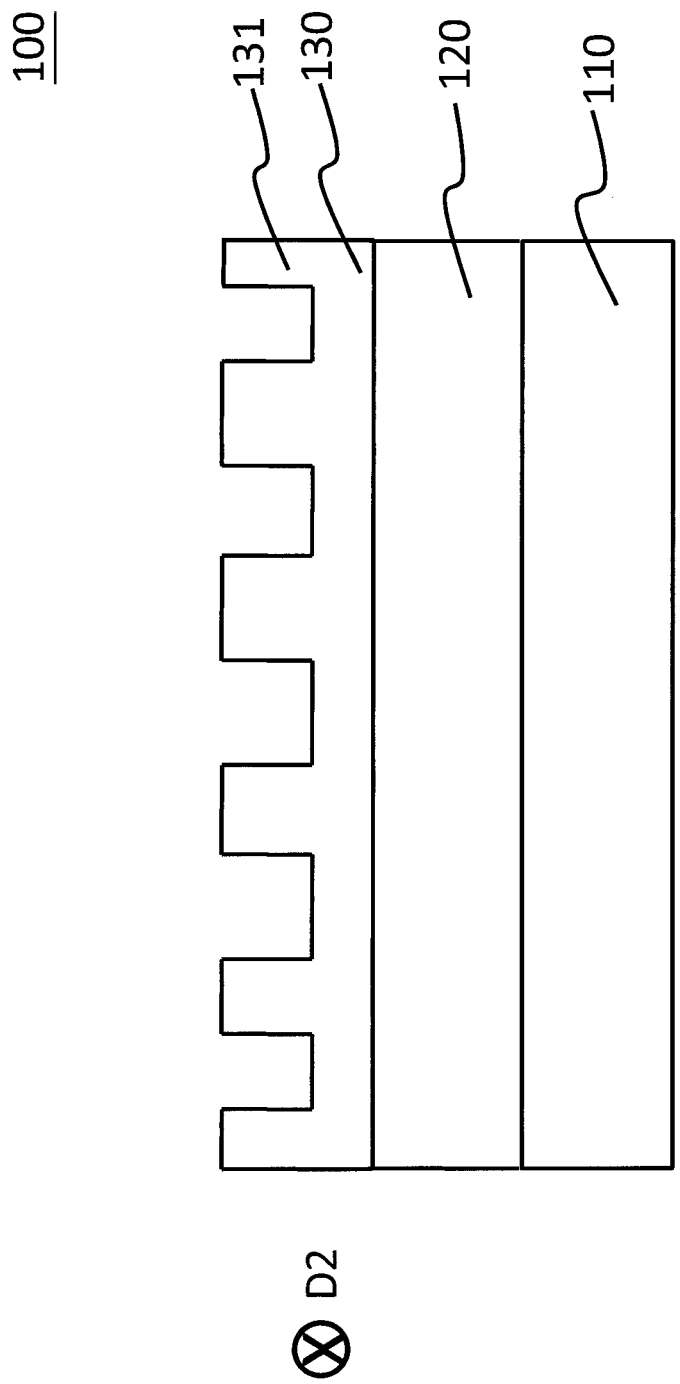

Then, the second curable resin 125 is embossed to form a second diffraction grating layer 130 comprising a plurality of second gratings 131 along with second direction D2, wherein the first direction D1 cross to the second direction D2 at an angle of 90±10° as shown in FIG. 5E. In addition, the dimension settings, such as widths, heights and gaps, of the first gratings 121 and the second gratings 131 can be the same or different depending on the demand of the different designs of LCDs. In an embodiment of the invention, widths, heights and gaps of the first gratings 121 and the second gratings 131 are the same. In another embodiment of the invention, widths, heights and gaps of the first gratings 121 and the second gratings 131 are different.

The embossing treatment for forming the second diffraction grafting layer 130 is same as that for forming the first diffraction grafting layer 120. In an embodiment of the method of the present invention, the embossing treatment for forming the first diffraction grating layer 120 is effected by a first grooved roller and the embossing treatment for forming the second diffraction grating layer 130 is effected by a second grooved roller. The groove structure of first roller can be extended along the rotating direction of the first grooved roller and the groove structure of the second grooved roller can be arranged in a direction perpendicular to the rotating direction of the second grooved roller. The directions of the groove structures of the first grooved roller and the second grooved roller can be exchanged to meet the property requirements of the final product.

Figure 5F:
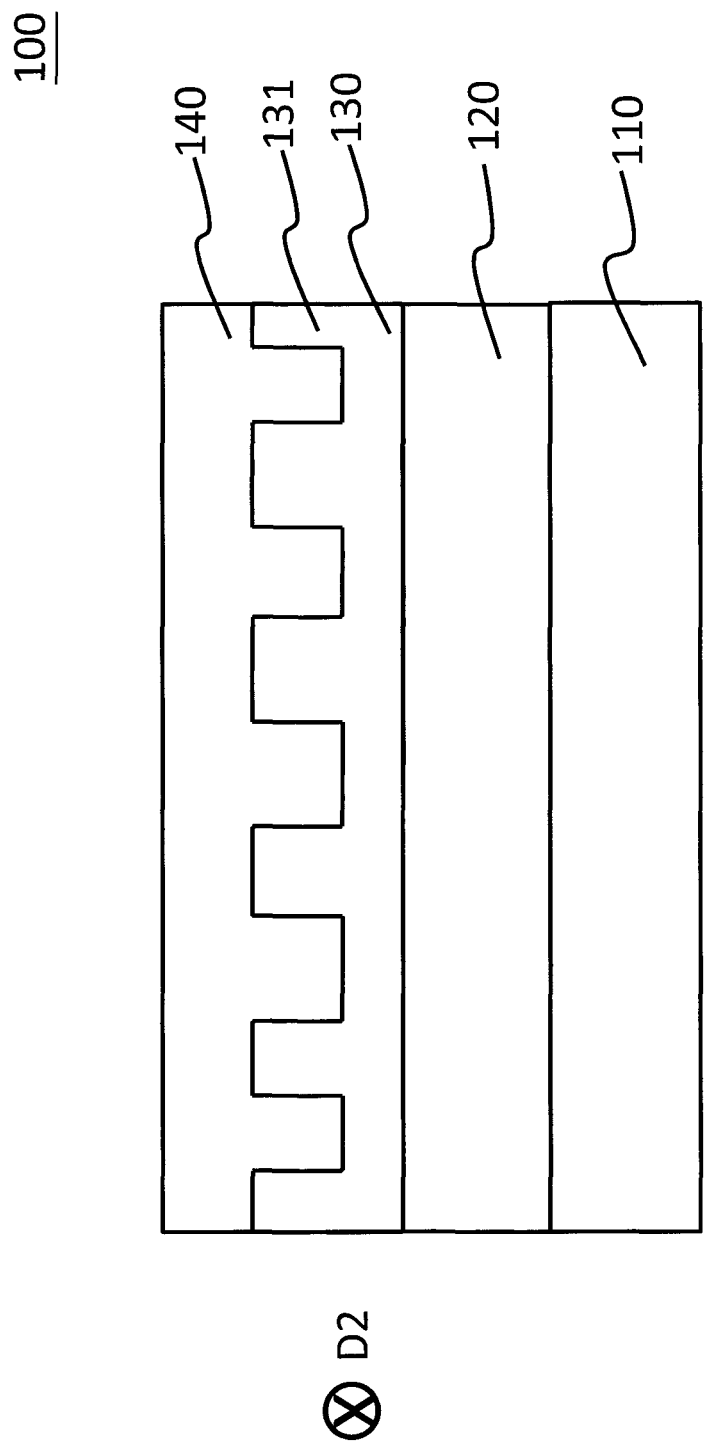

A third curable resin 140 with a third refractive of index of n3 can be coated selectively on the cured second diffraction grating layer 130 as shown in FIG. 5F. The third curable resin 140 can be an UV curable resin or a thermal curable resin. The third curable resin 140 can be, for example, an acrylic resin, a silicone resin, a polyurethane resin, an epoxy resin or combinations thereof. The difference of n2 and n3 is no less than 0.1 and no more than 0.3. In an embodiment of the method of the present invention, n2 is greater than n1 and n3, and n1 and n2 can be the same or different.

Figure 5G:
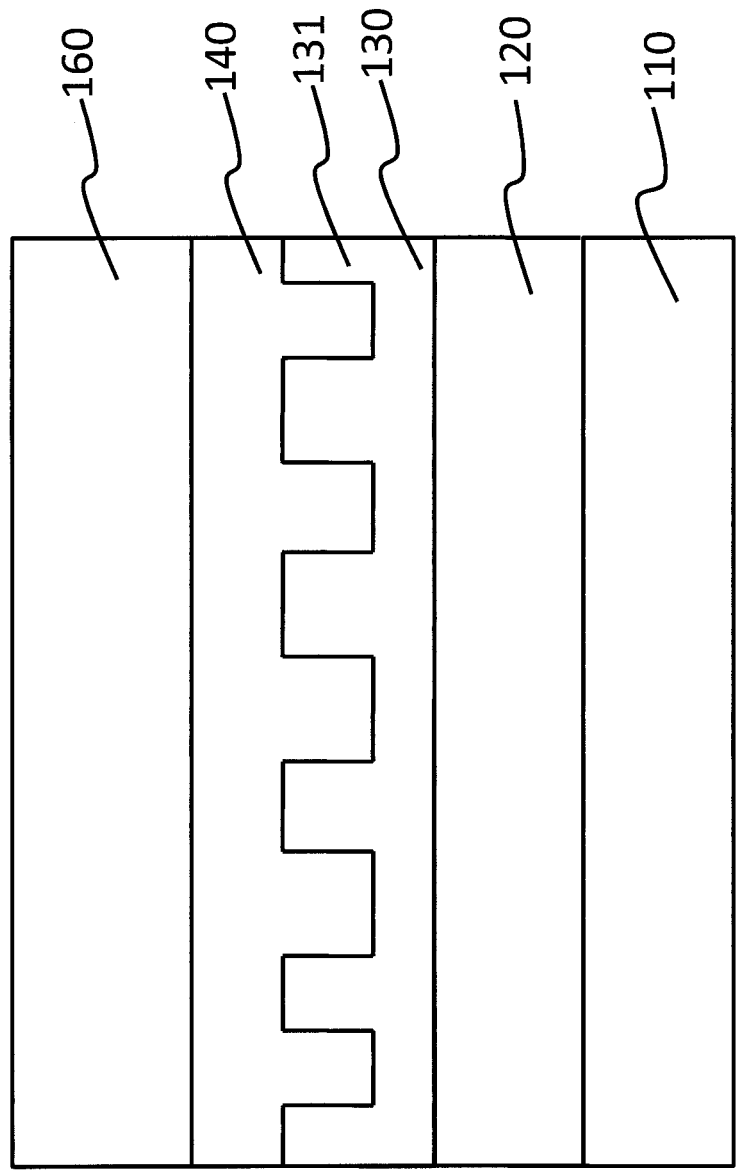

The light redirecting film 100 can be further adhered to an optical film 160 by the third curable resin 240 with or without an adhesive (not shown) therebetween as shown in FIG. 5G. The optical film 160 can be, such as a polarizing film, a hard-coating film, a low reflective film, an anti-reflective film, an anti-glaring film and an protective film or the like.

The present method for manufacturing a light redirecting film can be conducted in a batch production or a continuous production.

Figure 6:
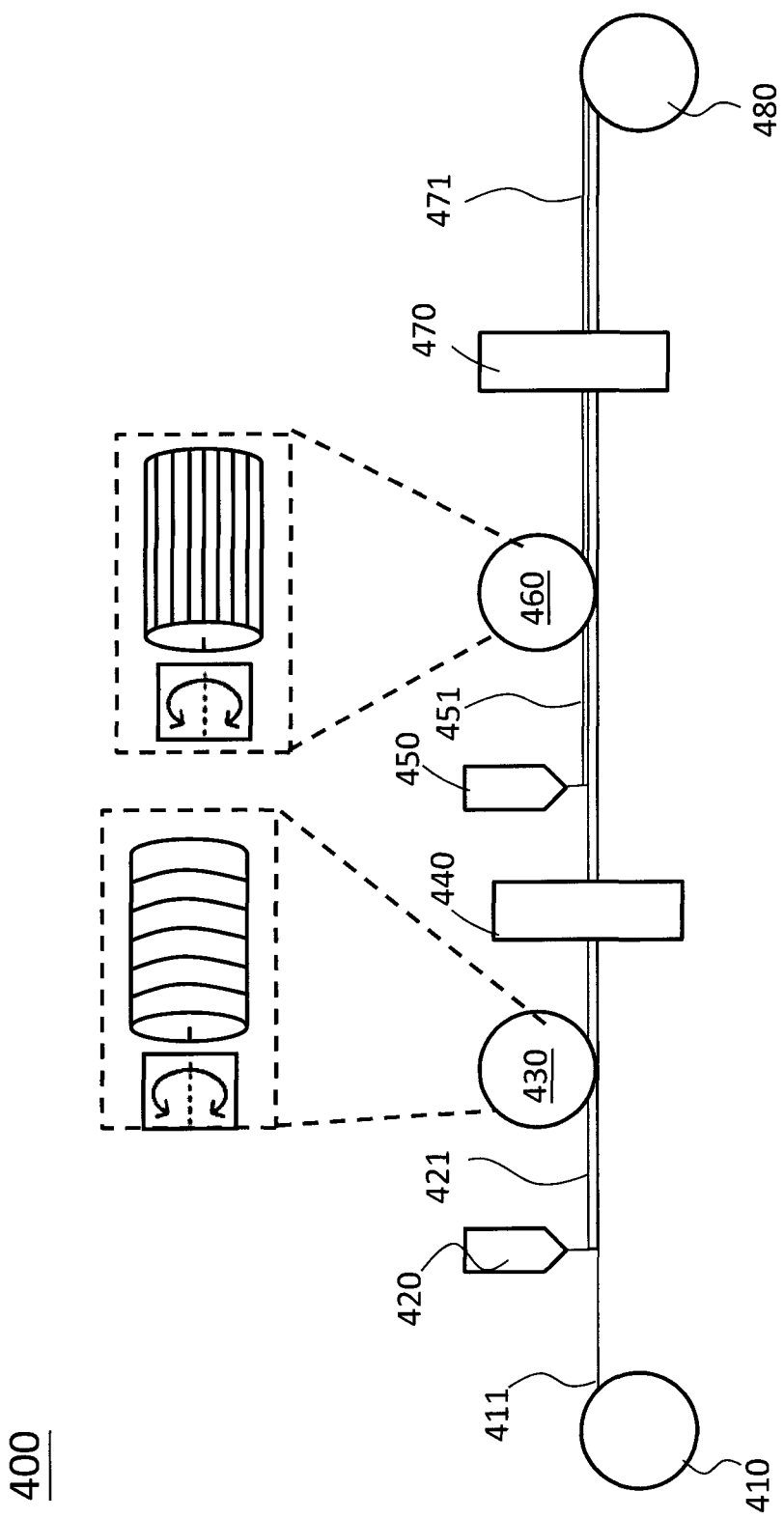
FIG. 6 is a diagrammatic view of a system for manufacturing a light redirecting film of an embodiment of the present invention.

FIG. 6 is a diagrammatic view of a system used for manufacturing a light redirecting film of an embodiment of the present invention in a continuous production, such as, for example, a roll-to-roll system 400.

As shown in FIG. 6, the present system 400 for manufacturing a light redirecting film comprises a substrate feed roller 410, a first resin feed tank 420, a first roller 430, a first curing means 440, a second resin feed tank 450, a second roller 460, a second curing means 470 and a take-up roller 480.

The substrate 411 is unwound from a substrate feed roller 410 and conveyed to pass through a first resin feed tank 420 to coat a first curable resin 421 thereon. The first curable resin 421 is embossed by a first roller 430 to form a first diffraction grating layer (not shown) on the first curable resin 421 and then cured via the first curing means 440, such as an UV curing means or a thermal curing means. A second curable resin 451 is coated on the cured first diffraction grating layer (not shown) by the second resin feed tank 450. The second curable resin 451 is embossed by a second roller 450 to form a second diffraction grating layer (not shown) on the second curable resin 451 and then cured via the second curing means 470, such as an UV curing means or a thermal curing means. In an embodiment of the present disclosure, the first roller 430 and the second roller 460 are grooved rollers, the groove structure of first roller 430 is extended along the rotating direction of the first roller 430 and the groove structure of the second roller 460 is arranged in a direction perpendicular to the rotating direction of the second roller 460, so that the grating directions of the first diffraction grating layer (not shown) and the second diffraction grating layer (not shown) of the result product cross each other at an angle of 90±10°. The directions of the groove structures of the first roller 430 and the second roller 460 can be exchanged to meet the property requirements of the final product. After curing treatment, a light redirecting film 471 is sequentially wounded on the take-up roller 480.

Figure 7:
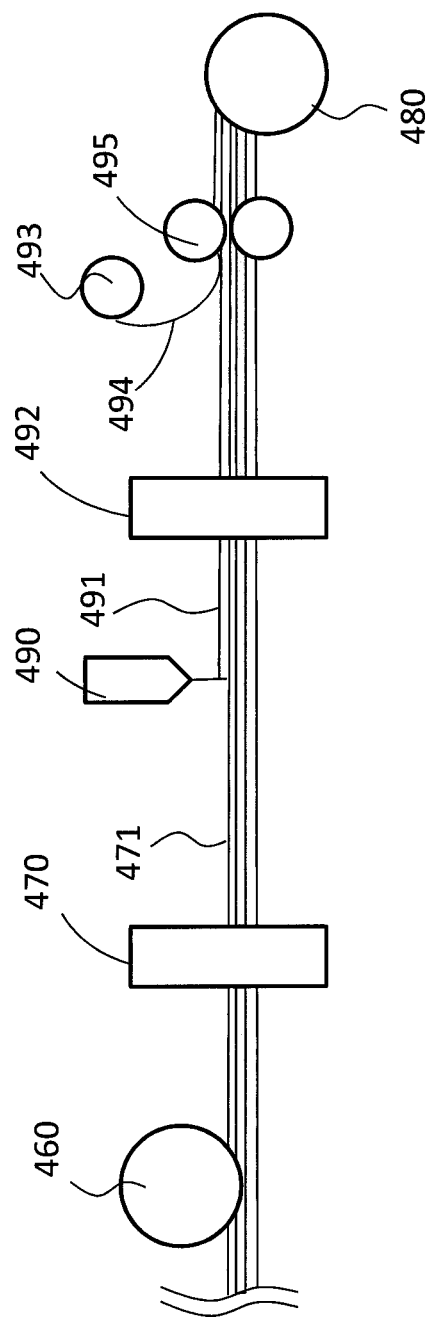
FIG. 7 is a diagrammatic view of a system for manufacturing a light redirecting film of another embodiment of the present invention.

In another embodiment, the system 400 for manufacturing a light redirection film can further comprises a third resin feed tank 490 and a third curing means 492. A third curable resin 491 is coated on the cured second diffraction grating layer (not shown) by the third resin feed tank 490 and then cured via the third curing means 492, such as an UV curing means or a thermal curing means as shown in FIG. 7.

In further another embodiment, the system for manufacturing a light redirection film can further comprises an optical film feed roller 493. The light redirection film 471 with the third curable resin 491 can be adhered to an optical film 494 which is rewound from an optical film feed roller 493. The optical film 494 and the light redirection film 471 are passed through a laminating means 495 and sequentially wound on take-up roller 480, as shown in FIG. 7. The optical film 494 wound on the optical film feed roller 493 can be an polarizing film, a hard-coating film, a low reflective film, an anti-reflective film, an anti-glaring film, a protective film or the like.

EXAMPLE

Example 1

The light redirecting film of this example comprises a first diffraction grating layer with a plurality of first gratings along with first direction D1 and a second diffraction grating layer with a plurality of second gratings along with second direction D2, and the first direction D1 and the second direction D2 cross each other at an angle of 90°. For example, the first gratings and the second gratings can be generated by sequential and periodically formed the gratings 1~11 with various dimensionsas shown in following Table 1 on the first diffraction grating layer and the second diffraction grating layer respectively. More or less gratings formed on the first diffraction grating layer and the second diffraction grating layer can also be generated according to this present invention.

TABLE 1

Dimensions of gratings on the first diffraction grating layer and the second diffraction grating layer of the light-redirecting film

| Dimensions of gratings | Gratings | | | | | | | | | | |
|---|---|---|---|---|---|---|---|---|---|---|---|
| | 1 | 2 | 3 | 4 | 5 | 6 | 7 | 8 | 9 | 10 | 11 |
| Width of w1, w2 ($\mu m$) | 0.6 | 0.6 | 0.5 | 0.4 | 0.5 | 0.6 | 0.6 | 0.5 | 0.4 | 0.4 | 0.4 |
| Height of d1, d2 ($\mu m$) | 1.3 | 0.8 | 0.9 | 0.8 | 1.1 | 1.0 | 1.2 | 1.0 | 0.7 | 0.8 | 0.8 |
| Gap of g1, g2 ($\mu m$) | 0.6 | 0.6 | 0.6 | 0.4 | 0.4 | 0.6 | 0.4 | 0.6 | 0.5 | 0.5 | 0.4 |

Example 2

The light redirecting film of this example comprises a first diffraction grating layer with a plurality of first gratings along with first direction D1 and a second diffraction grating layer with a plurality of second gratings along with second direction D2, and the first direction D1 and the second direction D2 cross each other at an angle of 90°. The first diffraction grating layer comprises a plurality of gratings with various dimensions and patterns as listed in the above Table 1. The gratings 1~11 with the above mentioned widths, heights and gaps are sequential and periodically formed on the first diffraction grating layer. The second diffraction grating layer comprises a plurality of second gratings with various dimensions and patterns as listed in the following Table 2. The gratings 12~20 as listed in Table 2 are sequential and periodically formed on the second diffraction grating layer.

TABLE 2

Dimensions of gratings of the second diffraction grating layer of the light-redirecting film

| Dimensions of gratings | Gratings | | | | | | | | |
|---|---|---|---|---|---|---|---|---|---|
| | 12 | 13 | 14 | 15 | 16 | 17 | 18 | 19 | 20 |
| Width of w2 ($\mu m$) | 0.7 | 0.7 | 0.7 | 0.81 | 0.81 | 0.81 | 1.28 | 1.28 | 1.28 |
| Height of d2 ($\mu m$) | 0.9 | 0.9 | 0.9 | 0.9 | 0.9 | 0.9 | 1.0 | 1.0 | 1.0 |
| Gap of g2 ($\mu m$) | 0.7 | 0.7 | 0.7 | 0.81 | 0.81 | 0.81 | 1.28 | 1.28 | 1.28 |

Gamma-value is an index reflecting to the contrast ration and color saturation of a display. Higher gamma-value represents that the display provides a better contrast ratio and more saturated color.

The LC display used for measuring the gamma-value is 50" HERAN 504K-C1(296H01) with 3840×2160 resolution. The gamma-values at different horizontal angles of a LC display with a light redirecting film of the present invention and a LC display without the present light redirecting film, as comparative example, are measured and showed in the following Table 3.

TABLE 3

The gamma value at different horizontal viewing angles

| | Horizontal viewing angle | | | | | | | | |
|---|---|---|---|---|---|---|---|---|---|
| | 0° | 10° | 20° | 30° | 40° | 50° | 60° | 70° | 80° |
| Comparative example | 2.24 | 2.03 | 1.71 | 1.44 | 1.23 | 1.07 | 0.94 | 0.87 | 0.87 |
| Example 1 | 1.81 | 1.74 | 1.60 | 1.43 | 1.27 | 1.13 | 1.02 | 0.96 | 0.99 |
| Example 2 | 1.88 | 1.81 | 1.63 | 1.46 | 1.29 | 1.14 | 1.03 | 0.97 | 1.00 |

The gamma-values at different vertical angles of a LC display with a light redirecting film of the present invention and a LC display without the present light redirecting film, as comparative example, are measured and showed in the following Table 4.

TABLE 4

The gamma-values at different vertical viewing angles

| | Vertical viewing angle | | | | | | | | |
|---|---|---|---|---|---|---|---|---|---|
| | 0° | 10° | 20° | 30° | 40° | 50° | 60° | 70° | 80° |
| Comparative example | 2.24 | 1.91 | 1.58 | 1.32 | 1.14 | 0.99 | 0.87 | 0.81 | 0.80 |
| Example 1 | 1.81 | 1.72 | 1.54 | 1.37 | 1.21 | 1.09 | 1.01 | 0.95 | 0.97 |
| Example 2 | 1.88 | 1.77 | 1.57 | 1.38 | 1.23 | 1.12 | 1.03 | 0.96 | 0.96 |

From the results of Examples 1 to 2 and Comparative Examples, The light redirecting films of Examples 1 to 2 can improve the contrast ratio and color saturation at horizontal viewing angles from 40° to 80°, and the contrast ratio and color saturation at vertical viewing angles from 30° to 80° can also be enhanced compared to the LC display without the light redirecting film.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A light redirecting film comprising:
   a substrate;
   a first diffraction grating layer formed on the substrate, and the first diffraction grating layer comprising a plurality of first gratings along with first direction; and
   a second diffraction grating layer formed on the first diffraction grating layer, and the second diffraction grating layer comprising a plurality of second gratings along with second direction;
   wherein the first direction and the second direction cross each other at an angle of 90±10°;

wherein the first diffraction grating layer includes a first curable resin having a first refractive index of n1, and the second diffraction grating layer includes a second resin having a second refractive index of n2, and the difference of n1 and n2 is no less than 0.1 and no more than 0.3, and when the light redirecting film is attached in front of a displaying side of a liquid crystal display (LCD), gamma values reflecting to the contrast ration and color saturation of the liquid crystal display (LCD) are greater than 0.9 at different horizontal and/or vertical viewing angles ≤80 degrees.

2. The light redirecting film according to claim 1, wherein n1 is in the range of 1.4 to 1.7.

3. The light redirecting film according to claim 1, wherein the widths of each of the first gratings and each of the second gratings are independently in the range of 0.3 μm to 1.5 μm.

4. The light redirecting film according to claim 1, wherein the gaps between adjacent two of the first gratings and the gaps between adjacent two of the second gratings are independently in the range of 0.3 μm to 1.5 μm.

5. The light redirecting film according to claim 1, wherein the heights of each of the first gratings and each of the second gratings are independently in the range of 0.5 μm to 1.5 μm.

6. The light redirecting film according to claim 1, wherein n2 is in the range of 1.4 to 1.7.

7. The light redirecting film according to claim 1, further comprising a third curable resin with a third refractive index of n3 formed on the second diffraction grating layer.

8. The light redirecting film according to claim 7, wherein n3 is in the range of 1.4 to 1.7.

9. The light redirecting film according to claim 7, wherein the difference of n2 and n3 is no less than 0.1 and no more than 0.3.

10. The light redirecting film according to claim 7, wherein n2 is greater than n1 and n3.

11. The light redirecting film according to claim 7, further comprising an optical film adhered to the third curable resin, wherein the optical film is selected from one of a group consisting of a polarizing film, a hard-coating film, a low reflective film, an anti-reflective film, an anti-glaring film and a protective film or combinations thereof.

12. A method for manufacturing a light redirecting film comprising the steps of:
providing a substrate;
coating a first curable resin on the substrate;
embossing the first curable resin and curing thereafter to form a first diffraction grating layer comprising a plurality of first gratings along with first direction;
coating a second curable resin on the first diffraction grating layer; and
embossing the second curable resin and curing thereafter to form a second diffraction grating layer comprising a plurality of second gratings along with second direction;
wherein the first direction and the second direction cross each other at an angle of 90±10°;
wherein, the first curable resin has a first refractive index of n1, and the second resin has a second refractive index of n2, and the difference of n1 and n2 is no less than 0.1 and no more than 0.3, and when the light redirecting film is attached in front of a displaying side of a liquid crystal display (LCD), gamma values reflecting to the contrast ration and color saturation of the liquid crystal display (LCD) are greater than 0.9 at different horizontal and/or vertical viewing angles 80 degrees.

13. The method according to claim 12, wherein the first curable resin is an UV curable resin or a thermal curable resin, and n1 is in the range of 1.4 to 1.7.

14. The method according to claim 12, wherein the embossed first curable resin is cured by UV radiation or heating treatment.

15. The method according to claim 12, wherein the second curable resin is an UV curable resin or a thermal curable resin, and n2 is in the range of 1.4 to 1.7.

16. The method according to claim 12, wherein the embossed curable second resin is cured by UV radiation or heating treatment.

17. The method according to claim 12, further comprising a step of coating a third curable resin with a third refractive index of n3 on the second diffraction grating layer.

18. The method according to claim 17, wherein the third curable resin is an UV curable resin or a thermal curable resin, and n3 is in the range of 1.4 to 1.7.

19. The method according to claim 17, wherein the difference of n2 and n3 is no less than 0.1 and no more than 0.3.

20. The method according to claim 17, wherein n2 is greater than n1 and n3.

21. The method according to claim 17, further comprising a step of adhering an optical film, selected from one of a group consisting of a polarizing film, a hard-coating film, a low reflective film, an anti-reflective film, an anti-glaring film and a protective film or combinations thereof, on the third curable resin.

22. A liquid crystal display (LCD) comprising:
a liquid crystal panel; and
a light redirecting film attached in front of the displaying side of the liquid crystal panel, comprising:
a substrate;
a first diffraction grating layer formed on the substrate, and the first diffraction grating layer comprising a plurality of first gratings along with first direction; and
a second diffraction grating layer formed on the first diffraction grating layer, and the second diffraction grating layer comprising a plurality of second gratings along with second direction;
wherein the first direction and the second direction cross each other at an angle of 90±10°;
wherein the first diffraction grating layer includes a first curable resin having a first refractive index of n1, and the second diffraction grating layer includes a second resin having a second refractive index of n2, and the difference of n1 and n2 is no less than 0.1 and no more than 0.3;
wherein gamma values reflecting to the contrast ration and color saturation of the liquid crystal display (LCD) are greater than 0.9 at different horizontal and/or vertical viewing angles ≤80 degrees.

23. The liquid crystal display (LCD) according to claim 22, wherein n1 is in the range of 1.4 to 1.7.

24. The liquid crystal display (LCD) according to claim 22, wherein the widths of each of the first gratings and each of the second gratings are independently in the range of 0.3 μm to 1.5 μm.

25. The liquid crystal display (LCD) according to claim 22, wherein the gaps between adjacent two of the first gratings and the gaps between adjacent two of the second gratings are independently in the range of 0.3 μm to 1.5 μm.

26. The liquid crystal display (LCD) according to claim 22, wherein the heights of each of the first gratings and each of the second gratings are independently in the range of 0.5 µm to 1.5 µm.

27. The liquid crystal display (LCD) according to claim 22, wherein n2 is in the range of 1.4 to 1.7.

28. The liquid crystal display (LCD) according to claim 22, further comprising a third curable resin with a third refractive index of n3 formed on the second diffraction grating layer, and n3 is in the range of 1.4 to 1.7.

29. The liquid crystal display (LCD) according to claim 28, wherein the difference of n2 and n3 is no less than 0.1 and no more than 0.3.

30. The liquid crystal display (LCD) according to claim 28, wherein n2 is greater than n1 and n3.

31. The liquid crystal display (LCD) according to claim 28, further comprising an optical film adhered to the third curable resin, wherein the optical film is selected from one of a group consisting of a polarizing film, a hard-coating film, a low reflective film, an anti-reflective film, an anti-glaring film and a protective film or combinations thereof.

* * * * *